(12) United States Patent
Stegmaier et al.

(10) Patent No.: US 9,405,278 B2
(45) Date of Patent: Aug. 2, 2016

(54) METHOD FOR OPERATING A SAFETY CONTROL DEVICE

(71) Applicant: Pilz GmbH & Co. KG, Ostfildern (DE)

(72) Inventors: Simon Stegmaier, Ostfildern (DE); Timo Nawratil, Ostfildern (DE); Juergen Wuellrich, Ostfildern (DE)

(73) Assignee: PILZ GMBH & CO. KG, Ostfildern (DE)

( * ) Notice: Subject to any disclaimer, the term of this patent is extended or adjusted under 35 U.S.C. 154(b) by 441 days.

(21) Appl. No.: 14/085,022

(22) Filed: Nov. 20, 2013

(65) Prior Publication Data

US 2014/0200687 A1 Jul. 17, 2014

Related U.S. Application Data

(63) Continuation of application No. PCT/EP2012/057827, filed on Apr. 27, 2012.

(30) Foreign Application Priority Data

May 23, 2011 (DE) .......................... 10 2011 102 274

(51) Int. Cl.
*G05B 9/03* (2006.01)
*G05B 19/042* (2006.01)

(52) U.S. Cl.
CPC .............. *G05B 9/03* (2013.01); *G05B 19/0428* (2013.01); *G05B 2219/14012* (2013.01);
(Continued)

(58) Field of Classification Search
CPC ......................................................... G05B 9/03
USPC .............................................. 700/79; 714/37
See application file for complete search history.

(56) References Cited

U.S. PATENT DOCUMENTS 6,417,582 B1 7/2002 Dold et al.
6,424,258 B1 7/2002 Claes
(Continued)

FOREIGN PATENT DOCUMENTS

DE 102 19 501 A1 11/2003
EP 1 355 230 A2 10/2003
(Continued)

OTHER PUBLICATIONS

Comba, Joao Luiz Dihl et al.; Affine Arithmetic and its Applications to Computer Graphics; 1993; 10 pp.
(Continued)

*Primary Examiner* — Tejal Gami
(74) *Attorney, Agent, or Firm* — Harness, Dickey & Pierce, P.L.C.

(57) ABSTRACT

A safety control device for safely controlling a hazardous installation has a first and a second calculation unit and an output unit for driving at least one actuator. The control device acquires an input signal and determines a floating point value depending on the input signal. The first and second calculation units each determine an input interval as a function of the floating point value. The first and second calculation units each further determine a result interval as a function of the input interval by applying a first calculation algorithm to the input interval. The first calculation algorithm is based on interval arithmetic. The result intervals from the first and second calculation units are compared and an output value is determined as a function of the result intervals. An output signal is determined as a function of the output value. The output signal drives the at least one actuator.

15 Claims, 7 Drawing Sheets

(52) U.S. Cl.
CPC ............... *G05B 2219/24003* (2013.01); *G05B 2219/24008* (2013.01); *G05B 2219/24182* (2013.01); *G05B 2219/24188* (2013.01); *G05B 2219/24189* (2013.01); *G05B 2219/24191* (2013.01)

(56) References Cited

U.S. PATENT DOCUMENTS

| | | |
|---|---|---|
| 7,142,943 B2 | 11/2006 | Groll et al. |
| 8,386,843 B2 | 2/2013 | Learmonth |
| 2002/0184283 A1 | 12/2002 | Steele, Jr. |
| 2003/0195912 A1 | 10/2003 | Wada |
| 2007/0176732 A1 | 8/2007 | Humpert et al. |
| 2010/0293530 A1 | 11/2010 | Ivancic et al. |
| 2012/0221897 A1 | 8/2012 | Richter |

FOREIGN PATENT DOCUMENTS

| | | |
|---|---|---|
| EP | 1 385 070 | 1/2004 |
| EP | 1 591 849 A1 | 11/2005 |
| WO | WO 2007/091005 A1 | 8/2007 |
| WO | WO 2009/155993 A1 | 12/2009 |
| WO | WO 2012/016574 A1 | 2/2012 |

OTHER PUBLICATIONS

Jorge Stolfi et al.; Self-Validated Numerical Methods and Applications; Jul. 1997; 122 pp.

E.R. Hansen; A Generalized Interval Arithmetic; Jan. 2011; 12 pp.

Arnold Neumaier; Taylor forms—use and limits; Oct. 13, 2002; 37 pp.

Atana Sengupta et al.; Theory and Methodology on comparing interva numbers; Jun. 1997; 16 pp.

Rosalind Cecily Young; The algebra of many-valued quantities; Mathematische Annalen; 1931; 32 pp.

David Monniaux; The pitfalls of verifying floating-point computations; Jan. 2007; 13 pp.

12th GAMM-IMACS International Sumposium on Scienfigic Computing, Computer Arithmetic and Validated Numerics; Sep. 2006; 15 pp.

Rupak Majumdar et al.; Systematic Testing for Control Applications; Jul. 2010; 12 pp.

Josh Milthorpe; Using Interval Analysis to Bound Numerical Errors in Scientific Computing; Oct. 2005; 117 pp.

Mario Rebolleda; Situation-based Process Monitoring in Complex Systems Considering Vagueness and Uncertainty; Feb. 2004; 161 pp.

T. Hickey et al.; Interval Arithmetic: From Principles to Implementation; Sep. 2001; 20 pp.

Peter Froehlick et al.; Ueberwachung verfahrenstechnischer Prozesse unter Verwendung eines qualitativen Modellierungsverfahrens; 1996; 88 pp.

International Search Report for PCT Appl'n No. PCT/EP2012/057827; mailing date of Nov. 22, 2012; 2 pp.

Peter Froehlich et al., Ueberwachung verfahrenstechnischer Prozesse unter Verwendung eines qualitativen Modellierungsverfahrens; 1996; 88 pp.

ISA/EP; English language translation of International Preliminary Report on Patentability (Chapter 1); issued by WIPO Nov. 26, 2013; 11 pages.

Chinese Search Report for Patent Appl'n No. 201280036502.9; dated May 20, 2015; 2 pp.

METHOD FOR OPERATING A SAFETY CONTROL DEVICE

CROSS REFERENCES TO RELATED APPLICATIONS

This application is a continuation of international patent application PCT/EP2012/057827 filed on Apr. 27, 2012 designating the U.S., which international patent application has been published in German language and claims priority from German patent application DE 10 2011 102 274.4 filed on May 23, 2011. The entire contents of these priority applications are incorporated herein by reference.

BACKGROUND OF THE INVENTION

The invention relates to a method for operating a safety control device and a corresponding safety control device.

Safety control devices are usually employed in order to monitor safety-critical areas in industry and to execute a countermeasure in the presence of a safety-critical problem. Safety control devices are typically connected in such a way as to exchange signals on the one hand with indicator devices and on the other hand with actuators. Indicator devices frequently employed for safety control devices include emergency-off buttons, safety door switches, two-hand switches, light barriers and a variety of sensors that provide safety-relevant signals from a monitored machine or machine installation. The safety control device then monitors safety-relevant signals from the indicator devices and evaluates them. Subsequently, depending on the evaluation, it generates control signals for control of the actuators. Typically these are then controlled in such a way that they bring about a safe condition of the installation. This can, for example, be achieved through a fail-safe switching off of the monitored installation. Alternatively or in addition, warning signals can be output to ensure the safety of the installation.

In order to ensure a particularly safe operation of the safety control device, they are typically made with redundant components. For example, the safety control device comprises two or more calculation units that perform the same tasks in parallel. In order to improve the safe operational capability, both the components and the software components processed by those components may have diverse designs, as a result of which internal, systematic errors can be compensated for. For this purpose it can, for example, be arranged that the calculation units come from different manufacturers and comprise different architectures. The important point is that it should be possible to compare two or more results from the different calculation units that have been determined in different ways on the basis of identical input data. If these results do not agree, a safety-relevant fault may exist in the safety control device. A reaction to such an error may include the execution of a suitable reaction step. For example, a warning signal can be output and/or an installation can be switched off. The transfer of control tasks to a secondary safety control device is also conceivable.

If the safety control device comprises more than two redundant components, a majority decision can be taken when the results are compared. In this way it is possible for the control task to continue if an internal fault is only present in one component. If only two components are available, an automatic countermeasure is taken as a rule. As a result, manual intervention in the installation on the part of a machine operative is usually required.

A precondition for the implementation of redundantly constructed safety control devices is a comparability of the calculated results from the components. In order to ensure this, integer calculations are typically carried out in safety control devices. Integers can be represented exactly in digital data processing, and the memory requirement when integers are used is only small. This also applies to fundamental types of calculation such as addition, subtraction, multiplication and integer division, whose results must be an integer again. Integer arithmetic moreover follows the fundamental rules of algebra, such as the associative law, the distributive law, and the commutative law. For this reason, algorithms that operate exclusively on integers are not sensitive to the permutation of operators, and are therefore robust.

It is disadvantageous that safety control devices are hitherto limited to integer operations. As a result, the precision of the results is reduced, since input signals can only be represented as integers, and therefore in most cases must be rounded up or down.

To improve the precision of the calculation, employment of floating point numbers is known from the field of general computer technology. A floating point number is an approximate representation of a real number. The floating point number is different from the fixed point number known in computer algebra. In a floating point number, a limited number of digits, the mantissa, is saved wherein the separator point is assumed to be located at a specified location. This mantissa is multiplied by another expression consisting of a base and an exponent. Typically, the value of the base is agreed by means of a convention. The exponent implicitly provides the actual location of the separator point. Floating point numbers are used so that both very large and very small numbers can easily be represented with a low memory requirement. This is achieved in that due to the "separated" separator point, the values can be scaled and new calculations can be carried out automatically. Using the floating point number makes it possible to perform significantly more accurate and complex calculations than is possible with integers. A memory of a calculation unit is exploited optimally in this way, so that the greatest possible achievable precision is ensured.

A special floating point arithmetic is known from numerical mathematics for calculations with floating point numbers. In this floating point arithmetic, the fundamental rules of algebra are partially inapplicable, since the rules of algebra can be infringed due to the arrangement of the operands around the separator point, and due to a limited length of floating point data types. The following (simplified) example is given for clarification:

The expression 0.125+4.5−4.0 consists of decimal numbers, and is to be calculated using floating point numbers in a binary system. The expression, and the decimal numbers indicated by it, have a finite representation in the binary system: 0.001+100.1−100.0.

If four bits are available to represent the binary numbers, all decimal numbers can be fully represented. Using brackets, the following calculation is obtained:

(0.001+100.1)−100.0=100.1−100.0=0.1

If the brackets are placed elsewhere, however, the following calculation is obtained, with a different result:

0.001+(100.1−100.0)=0.001+0.1=0.101

As illustrated, the choice of the brackets leads to different results in the binary system, whereas the corresponding application of the brackets to the expression using decimal numbers does not have any effect on the result.

On top of this is the fact that many decimal values do not have a finite expression as binary values. Storage in data types of finite size therefore usually requires rounding to a representable value. In addition, operations such as multiplication and division can increase the number of figures required for the exact representation. The frequency with which rounding occurs, and the rounding errors that arise in the process, depends largely on the implementation of the algorithm that applies the floating point arithmetic. It follows from this that when diverse hardware and software components are used for a redundant implementation, comparability of the calculated results cannot be assured. In an automation system using floating point numbers it is therefore possible that control could proceed on the basis of data with potentially unlimited errors. A safe automation system is not possible in this way.

One could contemplate to achieve comparability by avoiding diverse hardware or software, or by matching the diverse hardware and software to one another in such a way that precisely equivalent calculation results can be reached. Exactly equivalent calculation results from diverse hardware and software can, however, only be expected if operations are performed in precisely the same sequence, with precisely the same precision, and using the same rounding procedures, particularly in respect of their time and the direction of rounding. Neither the precision nor the sequence of operations can, however, be reliably determined, since available compilers and calculation units differ from one another significantly in these aspects. A safety control device of this type would therefore have to be fitted redundantly with identical hardware and software components. This would, however, conflict with the basic idea of safe automation, since it is precisely through diverse hardware and software that very high safety is achieved.

It might also be contemplated to replace floating point numbers by fixed point numbers, thus allowing a fixed point arithmetic to be applied. The fixed point arithmetic can, in turn, be implemented using integer arithmetic. However, for the same precision, this leads to a very high memory requirement, which is uneconomical and impractical.

In addition, a precision of the calculation result remains hidden in the approaches described, for which reason again a controller would proceed to operate on the basis of data with potentially any degree of error. The primary disadvantage in the use of floating point arithmetic in safe automation is therefore not overcome.

SUMMARY OF THE INVENTION

In view of the above, it is an object of the invention to provide a method for operating a safety control device with an increased precision while retaining safety at the same time.

According to a first aspect of the invention, there is provided a method for operating a safety control device for safely controlling a hazardous installation having at least one actuator, the method comprising the steps of providing a first calculation unit and providing a second calculation unit in the safety control device in order to form a redundant control unit, acquiring an input signal and feeding the input signal to the first and second calculation units, determining a floating point value depending on the input signal in each of the first and second calculation units, determining an input interval as a function of the floating point value in each of the first and second calculation units, determining a plurality of result intervals, wherein the first and second calculation units each determine a result interval as a function of the input interval by applying a first calculation algorithm to the input interval, the first calculation algorithm being based on interval arithmetic, comparing the result intervals from the first and second calculation units and determining an output value as a function of the result intervals, and outputting an output signal as a function of the output value, said output signal driving the at least one actuator.

According to another aspect, there is provided a safety control device comprising a first and a second calculation unit arranged so as to form a redundant control unit, an input unit designed for receiving an input signal and for determining a floating point value depending on the input signal, and an output unit designed for driving an actuator, wherein the input unit is connected to each of the first and second calculation units for feeding the floating point value to the first and second calculation units, wherein each of the first and second calculation units are configured to determine an input interval as a function of the floating point value and to determine a result interval as a function of the input interval by applying a first calculation algorithm to the input interval, the first calculation algorithm being based on interval arithmetic, wherein the first and the second calculation units are connected for comparing the result intervals and for determining an output value as a function of the result intervals, and wherein at least one of the first and second calculation units is connected to the output unit for outputting an output signal as a function of the output value, said output signal driving the at least one actuator.

The new method and device are based on the idea that a calculation algorithm using interval arithmetic is applied in each of the calculation units. The result is that a tolerance range is permitted, within which the floating point values can be reliably processed and subsequently compared. As a result, a precision of the safety control device when executing the calculation algorithm is increased, since rounding errors are kept small in magnitude. The precision when acquiring the input signal is furthermore improved over integer operations, since the input signal can be represented in the floating point value instead of as an integer. A more precise output signal can also be output.

The calculation units are preferably implemented as microcontrollers or microprocessors. In preferred embodiments, a plurality of different calculation units of diverse type are employed in the safety control device. They can, for example, be constructed in different ways. As a result, a very high level of safety is achieved with redundant processing of the input signal and with redundant determination of the output signal.

The use of interval arithmetic in particular permits the use of diverse hardware and software, since it determines intervals as a result. The result intervals of different calculation units can now be compared with one another, even when the results of the calculation units differ from each other.

Interval arithmetic is a method that makes it possible to calculate with value ranges, rather than with individual numerical values. The problem mentioned at the beginning, that floating point numbers have to be rounded a plurality of times, is overcome in that the input interval is formed on the basis of the floating point value, having an upper and a lower interval limit. The exact value of the floating point value lies between the interval limits. The interval arithmetic provides modified types of calculation, with the aid of which calculation with the input intervals can be performed reliably and precisely. The roundings that are carried out in the process are taken into account in that the interval is automatically enlarged or reduced depending on the roundings, so that the result interval contains the precise result value. Interval arithmetic thus refers to methods in which intervals are used as operands.

Suitable methods are known, for example, from the following documents, the full contents of which are incorporated by reference here:

Comba, Joao L. D.; Stolfi, Jorge, *Affine Arithmetic and Its Applications to Computer Graphics*, Proc. SIBGRAPI '93, VI Brazilian Symposium on Computer Graphics and Image Processing, 1993;

De Figueiredo, Luiz Henrique; Stolfi, Jorge, *Self-Validated Numerical Methods and Applications*, Brazilian Mathematics Colloquium Monograph, IMPA, Rio de Janeiro, Brazil, 1997;

Hansen, Eldon R., *A Generalized Interval Arithmetic*, Proc. International Symposium on Interval Mathematics, London, 1975;

Neumaier, Arnold, *Taylor Forms—Use and Limits*, Reliable Computing, 9, 2002;

Sengupta, Atanu; Pal, Tapan Kumar; *Theory and Methodology: On comparing interval numbers*, European Journal of Operational Research, 127, 2000; and Young, Rosalind Cecily, *The Algebra of Many-Valued Quantities*, Mathematische Annalen, Volume 4, Number 1, 1931.

The input signal is preferably obtained from an indicator device. The floating point value is determined on the basis of the input signal. This can, for example, be done with an A/D converter if the input signal is an analogue signal. By means of the floating point value, an input interval that contains the floating point value is then determined. The width of the interval, and thus the values for the upper and lower interval limits, can be determined in different ways. The floating point value should here be enclosed as closely as possible in order to permit high precision. One possibility is to specify fixed interval widths that are, for example, read from a memory. In preferred embodiments, the interval width can be determined depending on a tolerance value of the input signal. This tolerance value is obtained, for example, from measurement errors of a sensor and/or from a precision of the A/D converter.

In preferred embodiments, a plurality of input signals are acquired by the safety control device and are subjected to appropriate further processing. In addition, it is preferable that other required operands are also represented for the calculation unit as intervals if they cannot be represented exactly, or if this can only be done using a large amount of memory. Operands of this sort can, for example, be variable values and constants that are necessary for the first calculation algorithm.

In the calculation units, at least the first calculation algorithm is applied to the input interval. The first calculation algorithm can, for example, be implemented either as software or in the form of hardware. The calculation algorithm preferably comprises a number of calculation operations that are, for example, carried out sequentially. The calculation algorithm can also be a part of a higher-level algorithm, for example a single program routine or a program module. The first calculation algorithm applies the interval arithmetic so that result intervals are determined. The width of the result interval depends here in particular on error estimates that are performed on the basis of the self-validating properties of the interval arithmetic. The interval width of the particular result interval is thus optimized in order to give the smallest possible interval in which the precise value should lie.

With a plurality of calculation units, each calculation unit preferably comprises its own implementation of the first calculation algorithm, in order to satisfy the principle of diversity. The first calculation algorithms of the different calculation units are thus equivalent to one another in order to achieve the comparability. Preferably, however, they are not identical, from which it follows that result intervals from different calculation units can have different values. These can now be compared with one another, since there is no requirement for an exact agreement, but rather a partial agreement is sufficient, such as for example given the presence of an intersection interval.

For the execution of further subsequent first calculation algorithms by the calculation units, the corresponding result interval can, for example, be further processed, or it is possible, for example, for the intersection interval, obtained on the basis of different result intervals, to be further processed. Through the further processing of the intersection interval within the calculation units, these are automatically synchronized with one another. This has the advantage that the interval width of the result intervals is reduced, and thereby the precision of the calculation is increased.

The safety control device then outputs an output signal if an appropriate output criterion is satisfied. The specific output criterion depends on the specific task of the safety control device. The output criterion can, for example, be satisfied when one of the result intervals has a predefined value. Alternatively or in addition it is conceivable that the output criterion is satisfied when the processing of specified first calculation algorithms has been completed. It is also conceivable for the output criterion to be satisfied when no intersection interval exists. In this case it is preferably arranged that a substitute value is determined, for example by averaging the individual result intervals. This may also be done by taking a weighted average. If the output criterion is satisfied, an output value is determined depending on at least one input interval, which means that a specific value is determined, preferably represented as a floating point number, in order to retain the accuracy of the calculation.

The output signal is then determined depending on the output value. This is preferably performed within an interface between the safety control device and appropriate peripheral devices. This can, for example, be implemented with a D/A converter. This has the advantage that the high precision of the output value permits a correspondingly high precision when outputting the output signal.

In preferred embodiments, further process steps are implemented redundantly. In addition it is conceivable that further or all process steps are performed in the calculation units.

Altogether the facility is thus provided of further processing an input signal very precisely within a safety control device, and of determining an output signal with a very high precision. The fundamental concepts of safe automation are observed here, so that highly precise and very safe automation is permitted.

In a preferred refinement, a calculation precision of at least one of the calculation units is determined.

In this refinement, the calculation precision with which one of the calculation units determines the result interval concerned is determined. A calculation error can in particular be used as a measure for the calculation precision.

The calculation precision can, for example, be determined by monitoring rounding steps and determining their effect on the result interval. It is also conceivable that the precision of approximate calculation methods, like many numerical calculation procedures, is taken into account here.

The use of interval arithmetic also makes it possible to easily determine the precision of the result intervals, and thereby the precision of the output value as the calculation precision. This is preferably done by determining the width of the interval. In this way the precision of the result interval concerned can be evaluated.

The advantage here is that the known calculation precision can be employed to ensure that a safe operation of the safety control device is occurring. For example, the result interval and/or an output signal can be adjusted depending on the calculation precision. This also makes it possible to operate safety switching devices that only comprise a single calculation unit with floating point values safely, since, depending on the calculation precision, faulty output signals can be avoided.

In a further refinement, an interval width of the input interval is determined depending on the calculation precision.

In this refinement, the interval width for generating the input interval is determined automatically, and is thus taken into account in the formation of intervals. The interval width is adjusted depending on the calculation precision. For example, calculation algorithms that have already been executed can be analyzed, and an optimum interval width determined. The advantage here is that the interval width is adjusted dynamically to the input signals that are present, so that the calculation precision is continuously optimized.

In a further refinement, at least one reaction step is carried out if the calculation precision falls below a threshold value.

In this embodiment at least one countermeasure is carried out if a calculation precision required for safe operation is not given. The countermeasure is then performed in the form of a reaction step. The reaction step is a further step of the method. It can be performed as an overall predefined countermeasure, or as a countermeasure depending on current result intervals. The reaction step is performed if the calculation precision falls below the predefined threshold value. Since the calculation error is a measure for the calculation precision, this is equivalent to the calculation error exceeding a predefined error threshold value. It is an advantage here that safe operation of the safety control device is checked and is actively assured.

As a reaction step it can, for example, be arranged that the output criterion is satisfied. It can further be arranged that the output value is determined depending on a predefined value or depending on result intervals of further calculation units.

In a further refinement, a result interval width of at least one of the result intervals is determined, wherein the at least one reaction step is carried out if the result interval width exceeds a maximum width.

In this refinement, the safety control device is additionally made failsafe in that the result interval width, more precisely the interval width of at least one of the result intervals, is monitored. The maximum width can, for example, be available as a predefined value. Alternatively or in addition it is conceivable that the result intervals are compared with a reference interval that has the maximum width. It is preferably then arranged that the reference interval is determined on the basis of the input interval or on the basis of a preceding result interval. In particular it is arranged that the maximum width is determined depending on the interval width of the input interval. The maximum width, furthermore, can alternatively or in addition be determined depending on expectation values, values based on experience, precisions of measurement and/or precisions of calculation.

If the interval width of the result interval exceeds the maximum width, then the at least one reaction step is carried out. It is advantageous here that safety-critical faults that could, through specific sequences of calculation algorithms, lead to a result interval with an interval width of any size are very effectively excluded. The safety of the safety control device is in this way generally further increased.

In a further refinement, the result intervals of the calculation units are checked for interval overlap from time to time, wherein the at least one reaction step is carried out if at least one of the result intervals lies outside the further result intervals.

In this refinement, the result intervals are repeatedly compared with one another. An interval overlap, which for example can be calculated as an intersection interval, is determined. The intersection intervals then contain the common range of values of at least two result intervals from two different calculation units. Alternatively it is conceivable that a comparison of the interval limits is carried out. Advantageously, a simple facility is provided for exploiting the comparability of the result intervals and thereby for checking the safe operation of the safety switching device.

In preferred refinements, the interval overlap is determined at regular intervals, so that safe and correct operation of the safety control device is particularly well assured. This can, for example, be done at predefined intervals of time, or after completion of specific calculation steps of the first calculation algorithms.

As a reaction step it can, for example, be arranged that the output criterion is satisfied. It can, furthermore, be arranged that the output value is then determined depending on a predefined value or depending on result intervals of further calculation units.

In a further refinement, a result value is determined with at least one calculation unit depending on the floating point value, wherein in each case at least one further, second calculation algorithm that is equivalent to one of the first calculation algorithms is applied to the floating point value.

In this refinement, a second calculation algorithm is executed. This is done in parallel with the first calculation algorithm. Preferably this is done in addition to the first calculation algorithm in one of the calculation units. The first and the second calculation algorithms are equivalent to one another, wherein the first calculation algorithm applies the interval arithmetic and handles intervals, and where the second calculation algorithm preferably uses an alternative arithmetic and works with concrete values. This alternative arithmetic can, for example, be a floating point arithmetic or a fixed point arithmetic. The meaning of "equivalent" here is that the second calculation algorithm performs the same or equivalent steps as the first calculation algorithm.

In this way comparable result intervals can be determined in the calculation units by means of the first calculation algorithm. The second calculation algorithm makes it possible to check the results of the first calculation algorithm on the basis of result values. It is advantageous here that the result intervals can be checked and can be further restricted on the basis of the result values, so avoiding excessively large and thereby imprecise result intervals. A further advantage here is that precise result values are present, and at the same time a comparability of the results is enabled through the result intervals, which makes operation of the safety switching device yet more precise and safe.

In addition, depending on the result value, an interval can be determined that is used for further first calculation algorithms. For this purpose an appropriate value, differing by a certain amount from the result value, is preferably determined on the basis of the result interval. This amount can then be used in the formation of the subsequent interval in order to define the upper interval limit and the lower interval limit, wherein, starting from the highly precise result value, the amount is added to the result value for the upper interval limit and the amount is subtracted for the lower interval limit. The advantage here is simpler and yet safe operation of the safety control device.

In a further refinement, the result value is compared with at least one of the result intervals, wherein then the minimum of one reaction step is carried out if the result value lies outside the result interval.

In this refinement, the result intervals are additionally validated by the result values. The result value from the second calculation algorithm is for this purpose preferably compared with the result interval of a further calculation unit. In other words, the result intervals and result values are compared as a "cross-check". The result values must here lie within the relevant result intervals with which it is compared for operation to be safe. If this is not the case, the reaction step is carried out.

In a further refinement, the reaction step halts the process in at least one of the calculation units.

In this refinement, the process is stopped as the reaction step. This can occur in only one calculation unit, for example, if further calculation units continue to enable redundant operation. Moreover, the operation of the entire safety control device can also be stopped.

In preferred refinements it is also arranged that the output criterion is then satisfied. In further preferred refinements, a predefined output signal is output that ensures a safe condition of the machine which is controlled by the safety control device.

The advantage here is that control of the machine on the basis of possibly faulty output signals is effectively prevented.

In a further refinement, the reaction step synchronizes at least two of the calculation units.

In this refinement, a synchronization of the calculation units to common values is performed as a reaction step, said common values being provided as a basis for continued operation. The input intervals, the result intervals, or values supplied for repeated calculation algorithms can, for example, be synchronized here. In an advantageous manner this provides checking of the processing of the safety control device itself, thus ensuring yet higher safety.

For the sake of completeness it is pointed out that different triggers of the reaction step can also bring about differently configured reaction steps. It is also possible for a plurality of different reaction steps to be triggered simultaneously.

In one refinement, the input signal is acquired from a data bus.

In this refinement, the safety control device receives the input signal from the data bus, i.e. in digital form. In this way it is made possible for the safety control device to be connected, for example, with an input module. The input module then receives data from an associated indicator device, and can convert this into a digital form. In particular, the possibility is created for the input signal itself to be transferred to the safety control device already in the form of a floating point number. In this case, the input signal can correspond directly to the floating point value.

An advantage here is that a modular construction of an arrangement with the safety control device is permitted, wherein the safety control device can work together with different input modules. In this way a modular structure emerges, and a single safety control device can be connected in a simple manner with different indicator devices in that the input module is adjusted.

In a further refinement, the output signal is output on the data bus.

In this refinement, the safety control device sends the output signal on the data bus, i.e. in digital form. In this way it is possible for the safety control device to be connected, for example, with an output module. The output module then sends a signal to a corresponding actuator that controls a safety-relevant manipulated variable for the machine. In particular, the possibility is created for the output signal itself to be transferred to the actuator in the form of a floating point number. In this case, the output value can correspond directly to the output signal.

An advantage here is that a modular construction of an arrangement with the safety control device is permitted, wherein the safety control device can work together with different output modules. In this way a modular structure emerges, and a single safety control device can be connected in a simple manner with different actuators in that the output module is adjusted.

A CAN bus or a SafetyBUS can, for example, be employed as the data bus.

The CAN bus has the advantage that it is widely available in industry, and that in this way an economical implementation and compatibility of the safety control device is achieved. The SafetyBUS has the advantage of an architecture that is specially matched to safety-relevant purposes, so that through use of the SafetyBUS particularly high safety of operation is achieved.

In a further refinement, an actuator for a safety-relevant state parameter of a machine is controlled by means of the output signal.

In this refinement, the high precision of the output signal is employed to control a machine with great precision and safety. For example, a temperature, a pressure, a speed of rotation or a position in space (for example a tool position of a milling machine) may be considered, depending on the machine to be controlled, as the state parameter. The advantage here is that safety-critical systems can not only be monitored, but also can be controlled with great precision.

In a further refinement, a sensor signal of a sensor that acquires the safety-relevant state parameter of the machine is acquired as an input signal.

In this refinement, the input signal corresponds to the state parameter of the machine. Due to the high precision, the state parameter can be directly processed further within the safety control device. In a particularly preferred embodiment, a regulation of the machine occurs on the basis of the acquired state parameter by means of the actuator for the state parameter of the machine.

Sensors appropriate for the state parameter are preferably to be considered as the sensor, such as a temperature sensor, a pressure sensor, a speed of rotation sensor and/or a position measuring sensor.

In a further refinement, a switching signal from an emergency-off button can be received.

In this refinement, an emergency-off button is connected to the safety control device. The switching signal from the emergency-off button is received by the safety control device. This can be used to satisfy the output criterion. This means that if the emergency-off button is pressed, so triggering the switching signal, then the output signal is output. Alternatively or in addition it is conceivable that on acquiring the switching signal of the emergency-off button, the output value is determined depending on a predefined value, so that a known and defined condition of the controlled machine is set up.

It goes without saying that the characteristics mentioned above and those still to be explained below are not only usable in each of the combinations given, but also in other combinations or alone, without departing from the scope of the present invention.

BRIEF DESCRIPTION OF THE DRAWINGS

Exemplary embodiments are illustrated in the drawing, and are explained in more detail in the following description. Shown are.

DESCRIPTION OF PREFERRED EMBODIMENTS

Figure 1:
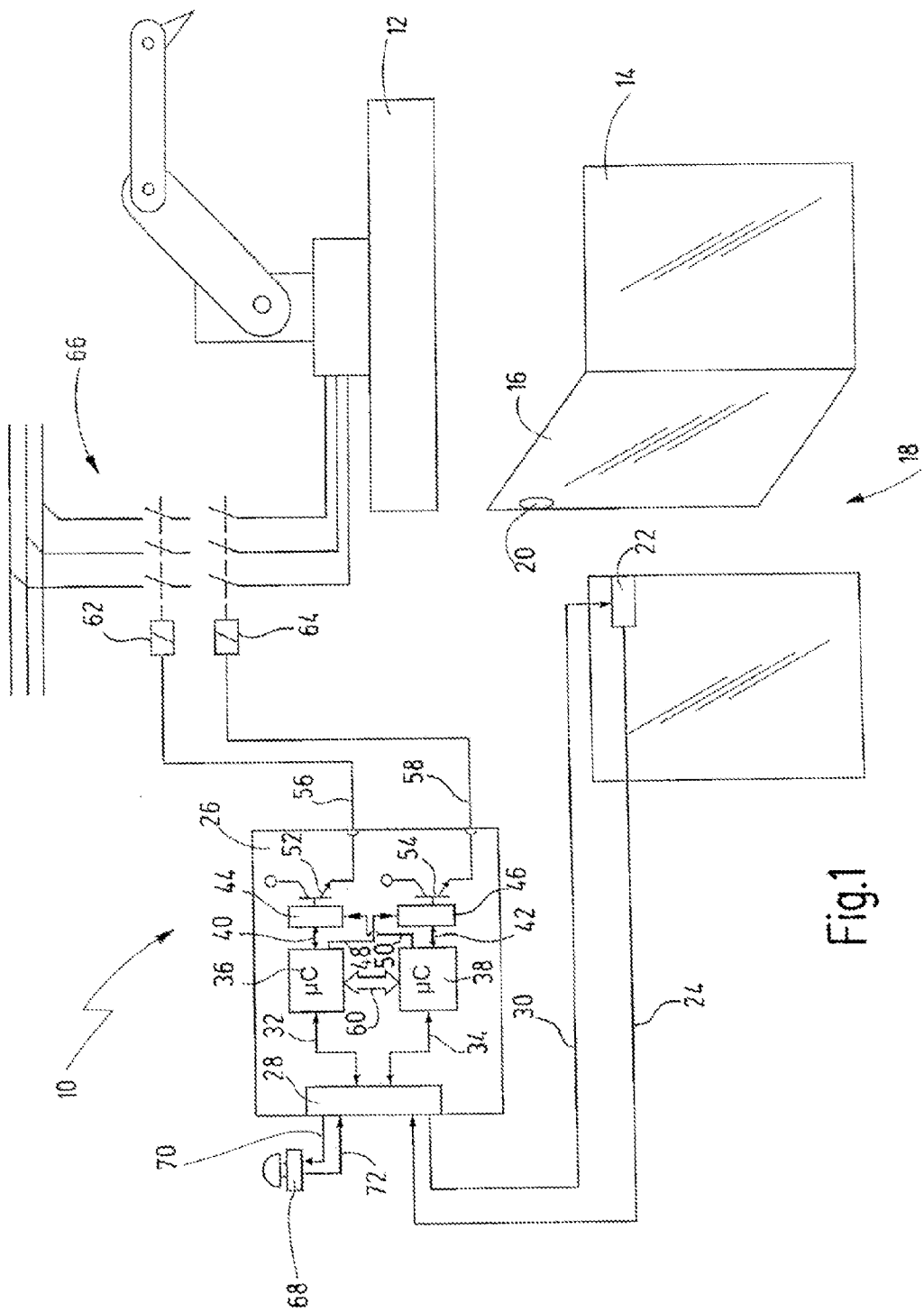
FIG. 1 a schematic illustration of a first exemplary embodiment of a safety control device in a first machine installation, FIG. 2 a schematic illustration of a second exemplary embodiment of the safety control device in a second machine installation, FIG. 3 a schematic illustration of a third exemplary embodiment of the safety control device in the second machine installation in association with a data bus, FIG. 4 a flow diagram of a preferred exemplary embodiment of the method according to the invention, FIG. 5 a detail of the flow diagram from FIG. 4, wherein additionally calculation precisions are determined, FIG. 6 a detail of the flow diagram of FIG. 4, wherein additionally result values are determined, FIG. 7 a schematic illustration of a signal curve, wherein result intervals are determined redundantly, and FIG. 8 a schematic illustration of a signal curve, wherein a result value is determined in addition.

In FIG. 1 an installation with an exemplary embodiment of the new safety control device is referred to as a whole by reference number 10. The installation 10 contains here for example a robot 12, the movements of which, when in working operation, present a hazard to persons who are in the working area of the robot 12. For this reason, the working area of the robot 12 is secured by a safety fence 14, which comprises a safety door 16. The safety door 16 permits access to the working area, for example for servicing work or for setting-up work. In normal working operation, the robot 12 should only operate when the safety door 16 is closed. As soon as the safety door 16 is opened, the robot 12 must be switched off or brought into a safe state in some other way.

In order to detect the state of the safety door 16, a safety door switch 18, having a door piece 20 and a frame piece 22, is attached to the safety door 16. The frame piece 22 generates a safety door signal on a cable 24, which is passed via the cable 24 to a safety control device 26 as an input signal.

The safety control device 26 has an input unit 28 with a large number of device connections, wherein the cable 24 is connected via one of the device connections to the input unit 28. In order to generate the input signal it is also arranged that the input unit 28 is connected to a signal line 30, over which a pulse signal is transmitted to the frame piece 22. The input signal on the cable 24 is converted in the input unit 28 into a floating point value. The floating point value is a digital value represented in a data type of a floating point number. The floating point value is passed on via signal lines 32 and 34 to calculation units 36 and 38. The calculation units 36 and 38 are each implemented as microcontrollers. The microcontrollers here are of different construction, so that a diverse hardware structure is created. An input interval depending on the floating point value is formed in each of the calculation units 36 and 38. After this, a first calculation algorithm is executed independently in each of the calculation units 36 and 38. The first calculation algorithms that are employed within the calculation units 36 and 38 are also of diverse implementation, so that in this way very high safety is ensured.

Result intervals that can represent intermediate results or final results are passed on via arrows 40 and 42 to comparison units 44 and 46. The comparison units 44 and 46 also receive, via arrows 48 and 50, the corresponding result interval from the other calculation unit 36 or 38. The result intervals are also compared to one another within the comparison units 44 and 46. If the result intervals overlap, a check is made as to whether an output criterion is satisfied. The output criterion is satisfied here when the result intervals contain a common value that corresponds to an open safety door 16.

In the case illustrated, an output signal is then transmitted if the door 16 is opened. In this case, the comparison units 44, 46 each determine an output value. The output value corresponds here to a sufficient supply of current to transistors 52 or 54. These thus generate, on the basis of the output value, an output signal that can be output redundantly over output lines 56 and 58. It is also arranged that the calculation units 36 and 38 can be synchronized to one another, as is illustrated schematically through double arrows 60. The synchronization can be done regularly and/or as a reaction step to a corresponding trigger. The output signals are passed via cables 56 and 58 to contactors 62 and 64, which interrupt a supply of power 66 to the robot 12 in response to the output signal.

The safety control device 26 is additionally connected to an emergency-off button 68 by means of cables 70 and 72 through the input unit 28. If the emergency-off button 68 is operated, a switching signal is passed on to the safety control device 26 via the cable 72. When this switching signal is received, it is recognized as such by the calculation units 36 and 38, and the output criterion is immediately satisfied. In the exemplary embodiment, the output value is then automatically set to a predefined value for supplying sufficient current to the transistors 52 and 54 so that the contactors 62 and 64 interrupt the power supply 66.

Figure 2:
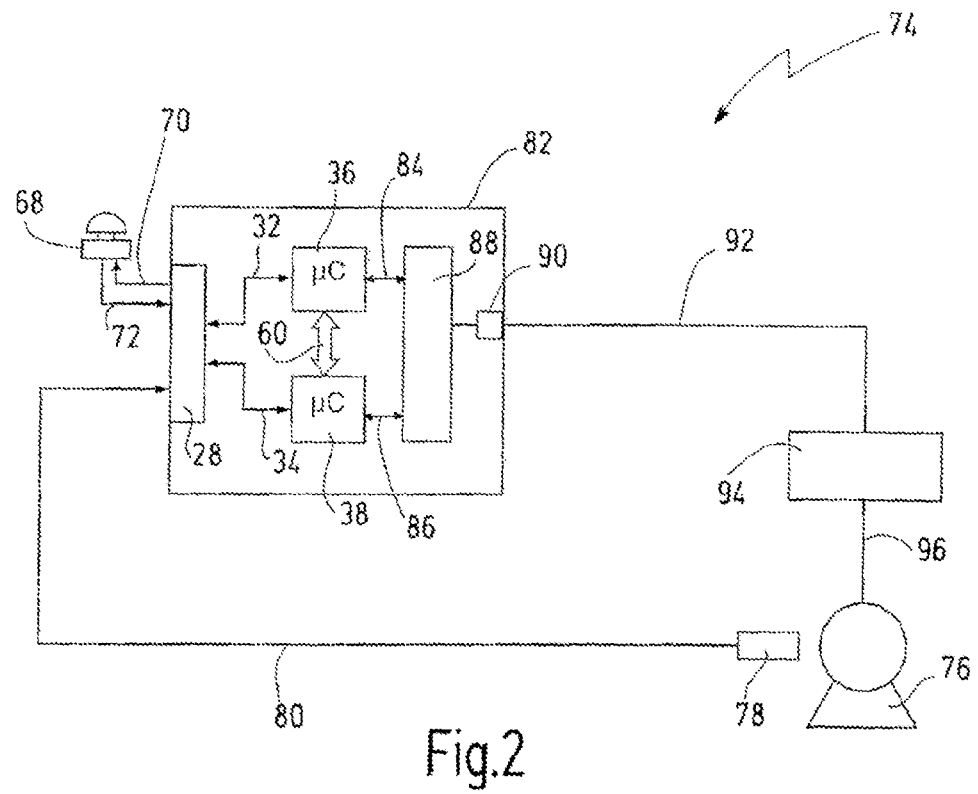

FIG. 2 shows a further installation with a safety control device, that is identified as a whole by reference number 74. The installation 74 comprises an electric motor 76, the speed of rotation of which is acquired through a speed of rotation sensor 78. The information regarding the speed of rotation is passed via a cable 80 to a safety control device 82 which regulates the speed of rotation. The safety control device 82 comprises the input unit 28 that corresponds to the input unit 28 of FIG. 1. The emergency-off button 68, with cables 70 and 72, is also provided as in FIG. 1. The floating point values from the input unit 28 are passed via the cables 32 and 34 to the calculation units 36 and 38. The result intervals that are determined by the calculation units 36 and 38 are passed via cables 84 and 86 to a single comparison unit 88. The comparison unit 88 checks whether an interval overlap exists between the result intervals.

If that is the case, then an output value is determined. This can, for example, be done by averaging or through a weighted averaging of one or of a plurality of result intervals. The output value formed in this way is passed via an output unit 90 in the form of a D/A converter, and via an output cable 92 to a power electronic unit 94. The power electronic unit 94 receives the output signal and generates a control signal, depending on the output signal, which is passed over the cable 96 to the electric motor 76.

If no interval overlap is present, a substitute value, depending on the two result intervals, is determined by averaging, and this is passed to the output unit 90. At the same time the calculation units 36 and 38 are synchronized with one another by the arrow 60.

Alternatively or in addition it is arranged that the output criterion is satisfied when no interval overlap is present. In this case, the output value is preferably set to a predefined value which can, for example, be a speed of rotation of 0, or a low and safe speed of rotation. The electric motor 76 is thus either switched off or is taken into a stable state if the result intervals are not at least partially in agreement.

If the emergency-off button 68 is pressed, a corresponding transition of the installation 74 into a safe state occurs.

Figure 3:
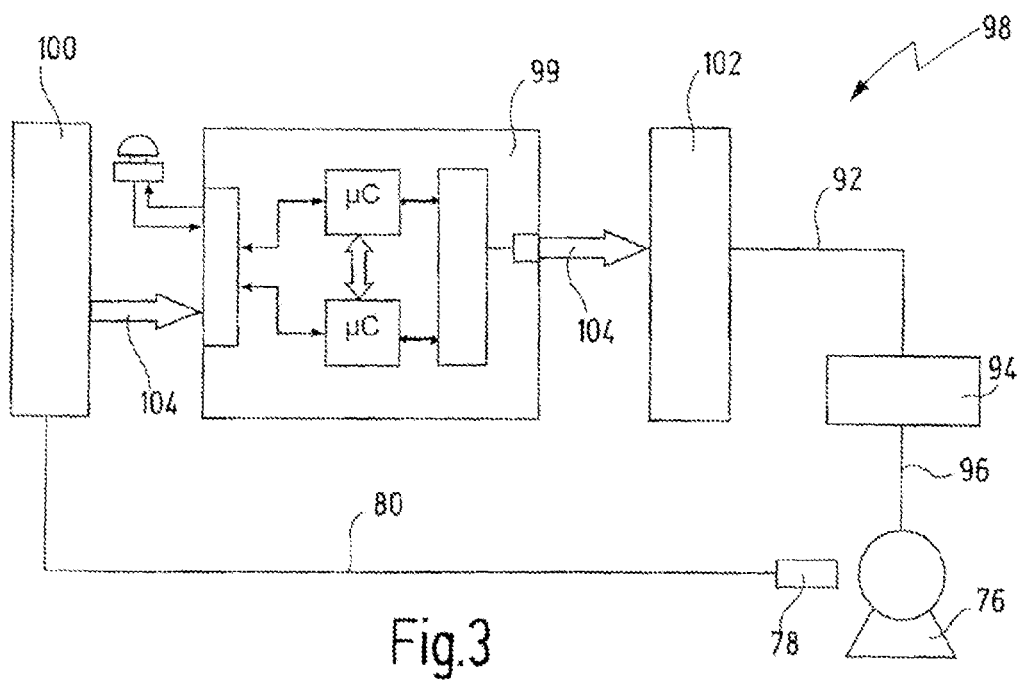

FIG. 3 illustrates a further installation, which is indicated as a whole by the reference number 98. It differs from the installation 74 of FIG. 2 in that a safety control device 99 operates together with an external input module 100 and an external output module 102.

In this exemplary embodiment, the input module 100 receives the signal on the cable 80, and converts it into a digital signal which is passed over a Safety BUS 104 as the input signal to the safety control device 99. In a corresponding manner, the output signal is passed as a digital value over the Safety BUS 104 to the output module 102, which passes the control signal over the cable 92 to the power electronic unit 94.

The input module 100 determines a digital value in the form of a floating point number depending on the signal from the cable 80. The digital value is passed over the Safety BUS 104. The signal from the cable 80 can thus be evaluated with particular precision, and can be further processed by the safety control device 99. A digital value is, furthermore, passed as an output signal in the form of a floating point number over the Safety BUS 104 to the output module 102, so that this can output an extremely precise signal. This gives rise to a modular structure for a system with the safety control device 99 for controlling and/or regulating the installation 98. The safety control device 99 can thus be employed in different installations, wherein appropriate modules can be selected depending on the requirements of the indicator devices and actuators.

Figure 4:
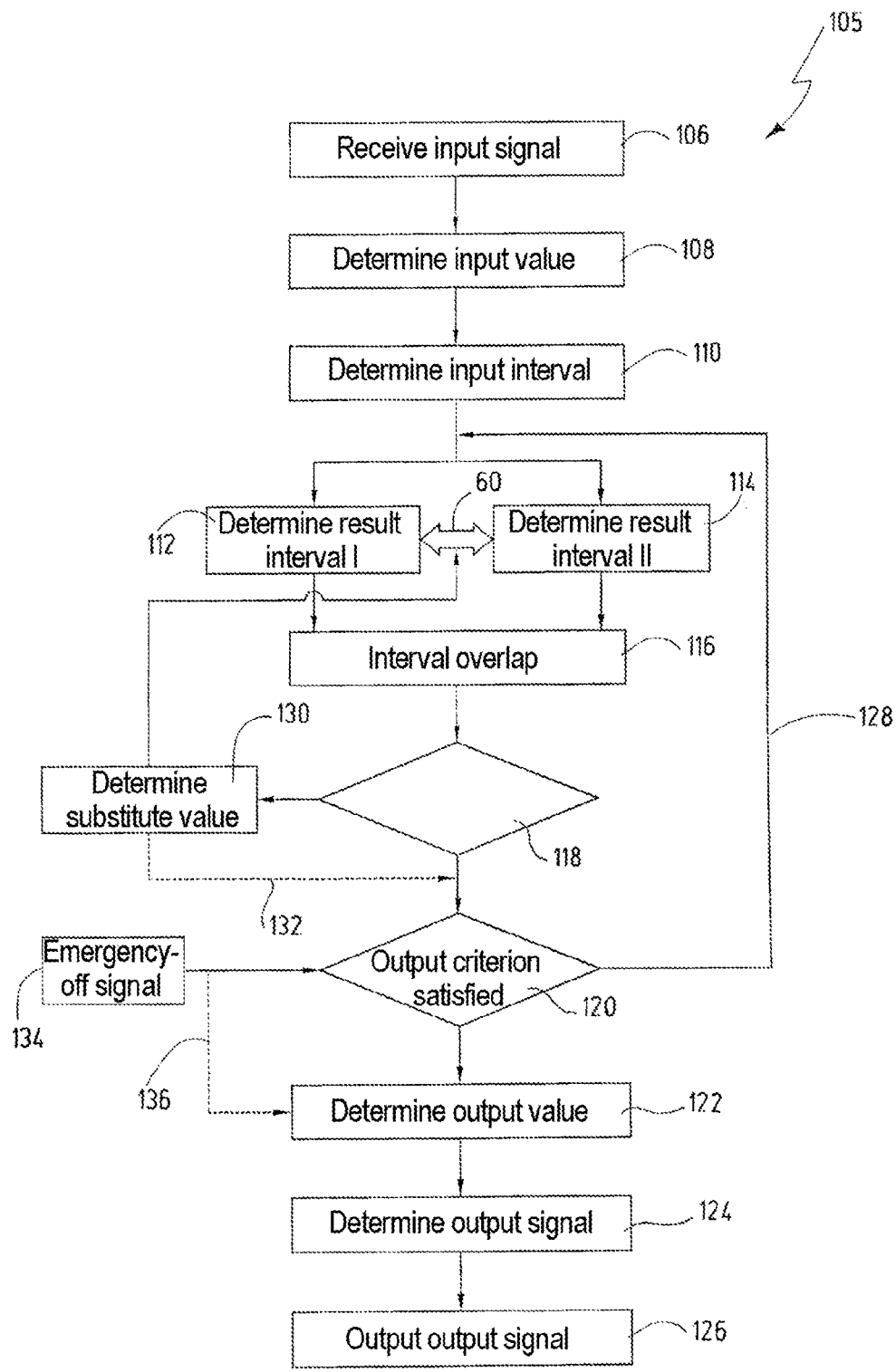

FIG. 4 illustrates a flow diagram, identified as a whole by reference number 105. The flow diagram 105 describes an exemplary embodiment of the method according to the invention.

In a step 106, an input signal is received from a safety control device. This can, for example, be a digital or an analogue input signal.

In step 108, a floating point value is determined, and is represented as a floating point number. The concrete numerical value of the floating point value results here from the input signal, wherein this, in the case of an analogue input signal, can for example be determined by an A/D converter.

In a step 110, at least one input interval is determined on the basis of the floating point value. For this purpose an upper interval limit and a lower interval limit are defined, wherein the floating point value lies between the two interval limits. The distance of the interval limits from the floating point value can be defined in a variety of ways. Here it is done using a predefined value that is read from a memory. In addition, further intervals which are necessary to prepare additional operators for a later calculation are defined in the step 110.

It is furthermore conceivable that the determination of the input interval is performed redundantly, so that two input intervals are determined in parallel in the different calculation units on the basis of the one floating point value.

The input interval is processed further in the steps 112 and 114, which are performed in parallel. The calculation units here each determine one result interval, referred to here for the sake of clearer distinction as result interval I and as result interval II. The result intervals I and II are determined by the first calculation algorithms on the basis of the input interval, and depending on additional parameters.

The result intervals I and II are passed on to a further step 116. In step 116 an interval overlap is determined, for example in the form of an intersection interval. This can be done through a simple set operation.

The interval overlap is transferred to a further step 118. This checks whether the interval overlap is present. If the interval overlap is present, then a check is made in a subsequent step 120 as to whether this interval overlap satisfies an output criterion. If the interval overlap satisfies, or alternatively if the result intervals satisfy, the output criterion, then an output value is determined in a step 122 depending on the interval overlap or the result intervals. This output value is calculated here by averaging the interval overlap. As a result, a floating point number is in turn obtained as the output value.

Depending on the floating point number, an output signal is generated in a further step 124. This can, for example, be done using a D/A converter.

Finally the output signal is output to peripheral devices that are able to exchange signals with the safety control device in a step 126.

Proceeding from step 120, control loops back via an arrow 128 to a further first calculation algorithm if the output criterion is not satisfied by the interval overlap. This ensures that after proceeding through first calculation algorithms, a determination is made regularly in steps 112 and 114 as to whether the result intervals are supplying comparable results, and at the same time the processing of more complex programs that consist of a sequence of first calculation algorithms is not interrupted.

Proceeding from step 118, control passes then to a step 130 if no interval overlap is present. In step 130 a substitute value is determined as a reaction step, which can, for example, be done by averaging the result intervals I and II. This value is then returned to the calculation units, wherein as a further reaction step a synchronization 60 takes place. Alternatively or in addition it is conceivable that the substitute value is output via an arrow 132, shown here by a broken line, to the step 120. In step 120 it is then recognized that a substitute value is involved, and thus that no interval overlap is present. On the basis of this information different, further reaction steps can be executed. One reaction step is that the selection criterion is satisfied. The substitute value is furthermore used to determine the output value in step 122. As an alternative it is conceivable that the safety control device or the procedure is halted.

It is also arranged that in a step 134 an emergency-off signal of the emergency-off button 68 is detected. This is passed to a step 120, which can satisfy the output criterion there. The satisfaction of the output criterion by the emergency-off signal can, in turn, have different results. On the one hand it can force an output of the current output value. Alternatively it is conceivable that the output value is itself formed in step 122 on the basis of the emergency-off signal, as is illustrated, for example, by the broken arrow 136. As a further alternative it is conceivable that the output value is determined depending on a predefined value when the output criterion is satisfied by the emergency-off signal.

Taken together this yields a method that permits a calculation with floating point numbers, wherein aspects such as a redundant processing of the method, the possibility of using diverse hardware and software, and the possibility of certifying the method are taken into account at the same time.

In further embodiments not illustrated here, all of the illustrated steps may be designed with single or multiple redundancy, so that in this way the safety is further increased.

Figure 5:
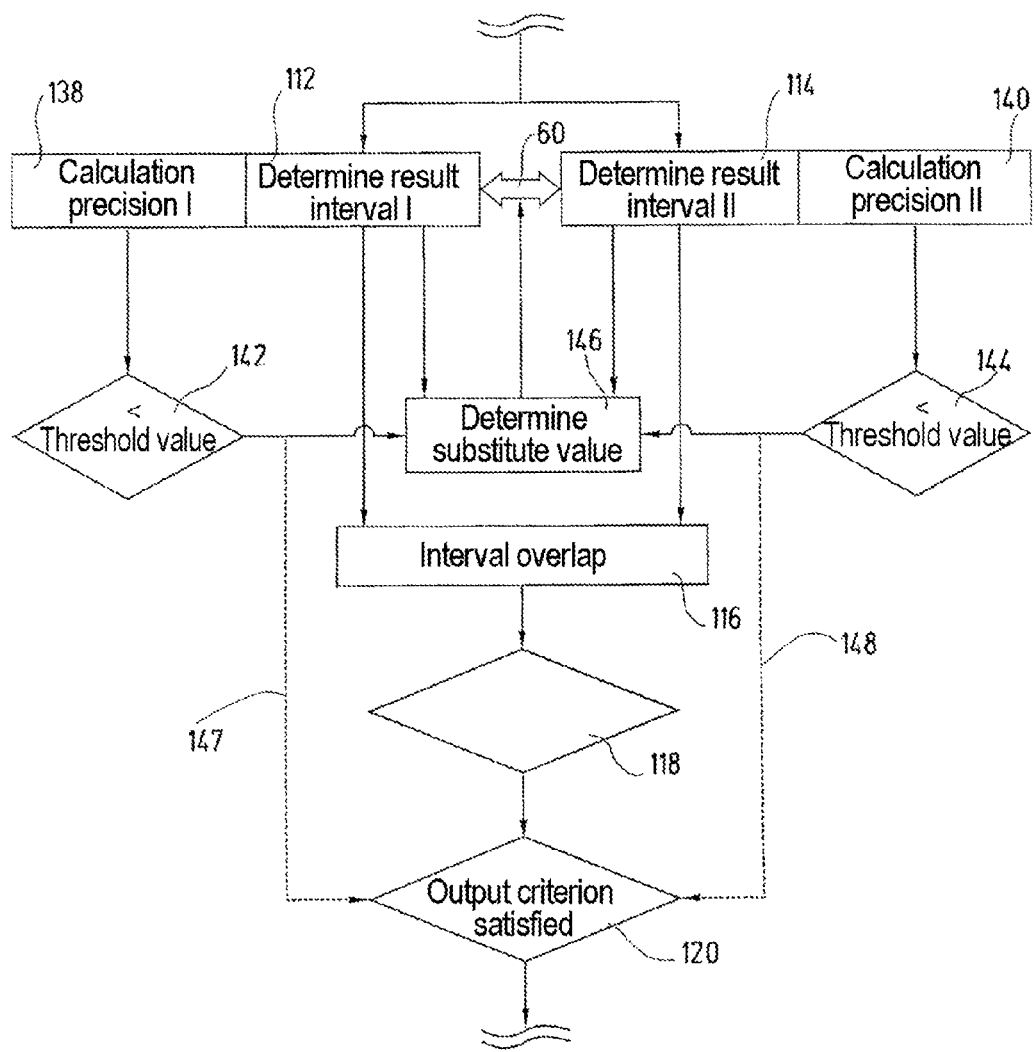

FIG. 5 shows a detail of the method from FIG. 4, wherein additional calculation precisions I and II are determined in the steps 112 and 114. A calculation precision I of step 112 is determined in a step 138 in parallel with step 112. Similarly a calculation precision II is determined in parallel with step 114 in a step 140.

The calculation precision can, for example, be determined in that rounding processes and numerical estimation procedures within the first calculation algorithms are recorded and their errors added together.

The calculation precisions I and II are passed on to the steps 142 and, correspondingly, 144. In the steps 120 and 144, the calculation precisions I and II are compared with associated threshold values. If the calculation precisions I and II lie above the threshold value, no action is carried out. If, however, they lie below the associated threshold values, then the determination of a further substitute value is carried out in a step 146, wherein the result intervals I and II from steps 112 and 114 are also passed to the step 146 for this purpose. The substitute value from step 146 is then used in order to carry out a synchronization 60 at the calculation units.

In an alternative arrangement the output criterion is satisfied in step 120 when the value falls below one of the threshold values from the steps 120 or 144. This is illustrated by the arrows 147 and 148, drawn with broken lines.

If the output criterion is satisfied by falling below the threshold values, then it is in turn possible for the output value to be determined depending on the last interval overlap, or for the output value to be determined on the basis of a predefined value for this number.

Figure 6:
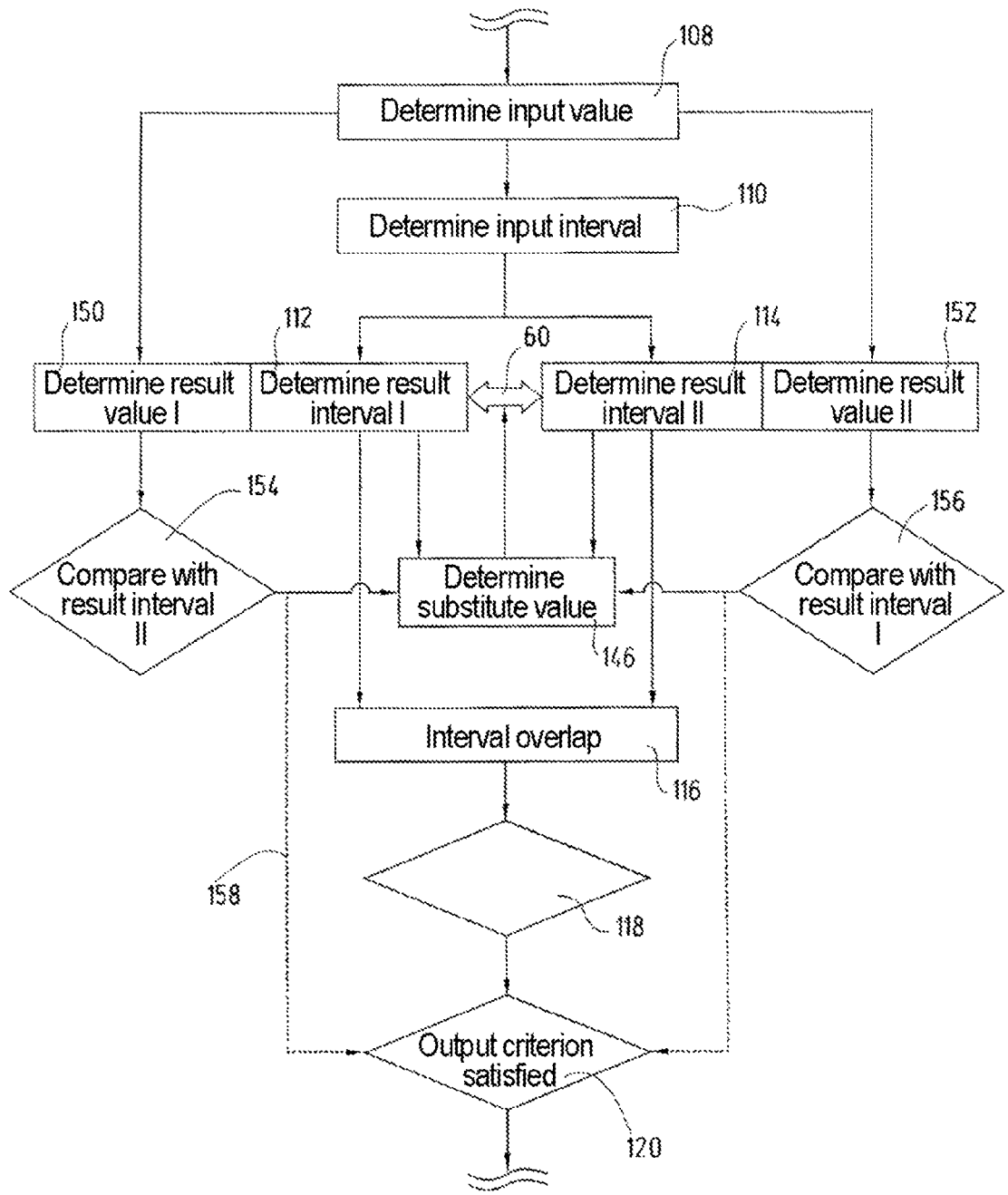

FIG. 6 also illustrates a detail of the flow diagram of FIG. 4. In addition to the steps illustrated in FIG. 4, result values I and II are also determined in parallel with the processing of the first calculation algorithms in respect of the result intervals. This is done in the steps 150 and 152. The floating point value is passed from step 108 to the steps 150 and 152. Within the steps 150 and 152, second calculation algorithms, adjusted in each case, are applied to the floating point numbers, so that the result values I and II can be determined. The second calculation algorithms from steps 150 and 152 are in each case equivalent to the first calculation algorithms of steps 112 and 114. They differ from the first calculation algorithms in steps 112 and 114 in that calculation is not carried out with intervals.

The result values I and II are passed on to steps 154 and 156. In step 154 the result value I from step 150 is compared with the result interval II from step 152. If the result value I lies within the result interval II, no further measures are taken. If the result value I does not lie within the result interval II, then a further substitute value is determined in step 146, wherein the step 146 contains the current result intervals I and II from the steps 112 and 114. A synchronization 60 is subsequently carried out as a reaction step. As an alternative, as described in FIG. 5, the output criterion can correspondingly be satisfied by an arrow 158. As a result it is again possible for the output criterion to be determined in different ways according to requirements.

Step 156 operates correspondingly to step 154, wherein a check is made here as to whether the result value II from step 152 lies in the result interval I from step 150.

For the sake of completeness it is pointed out here that the method is not limited to the individual exemplary embodiments of FIG. 4, 5 or 6, but rather that a combination of the different variants is possible.

Figure 7:
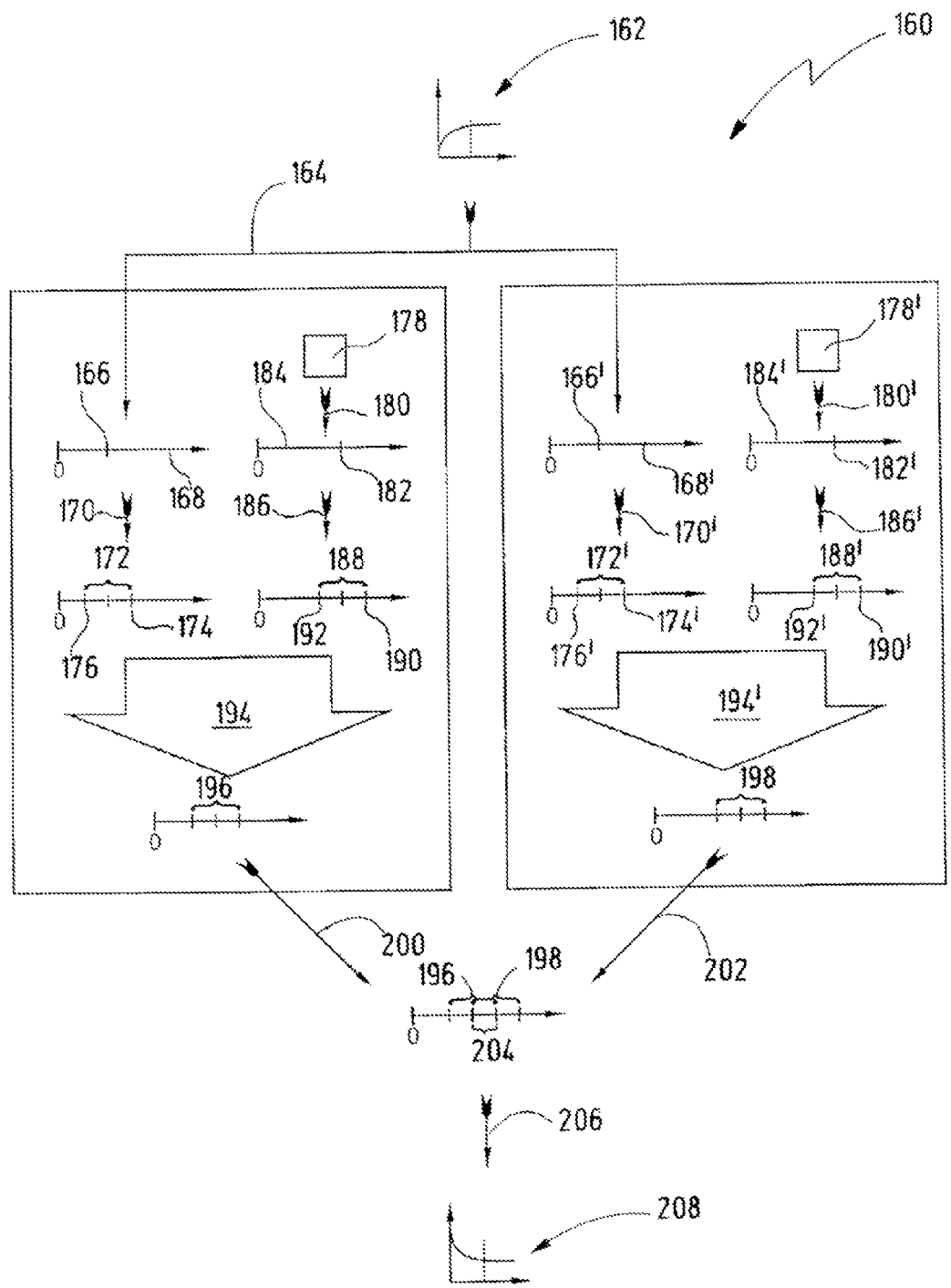

FIG. 7 illustrates a signal curve 160 within a safety control device according to the invention. An input signal 162 is passed via an arrow 164 to the calculation units 36 and 38. Both calculation units 36 and 38 are operated in an equivalent manner although they are of diverse construction.

The input signal 162 is converted into a floating point value 166 that is represented on a numerical scale 168. An arrow 170 indicates a following step. In this, an input interval 172 with an upper interval limit 174 and a lower interval limit 176 is determined depending on the floating point value 166. In parallel with this, a parameter value 182 is read via an arrow 180 from a memory 178. The parameter value 182 is also represented on a numerical scale 184. In arrow 186, an interval 188 with an upper interval limit 190 and a lower interval limit 192 is formed.

A first calculation algorithm 194 is illustrated as a broad arrow. The input interval 172 and the interval 188 are passed to this calculation algorithm. The first calculation algorithm then determines a result interval 196.

In a corresponding manner, a result interval 198, which differs from the result interval 196, is determined by the calculation unit 38.

The result intervals 196 and 198 are brought together via arrows 200 and 202. An interval overlap 204 is subsequently determined. Further steps can finally be carried out, as has already been described and is illustrated here by an arrow 206, so that an output signal 208 is formed.

Figure 8:
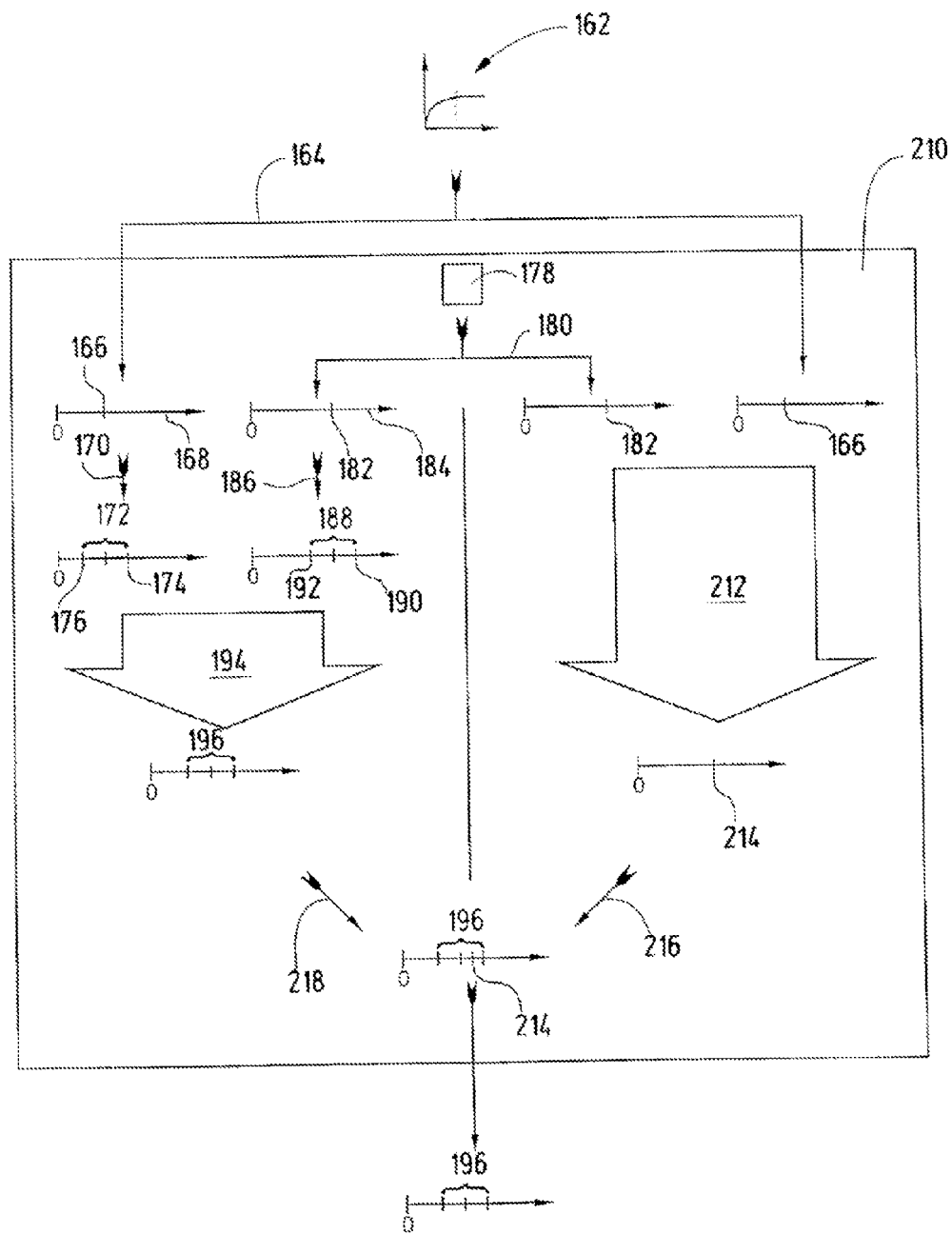

FIG. 8 shows a further signal curve for a single calculation unit 210. This comprises the signal curve in the calculation unit 36 from FIG. 7, which is given the same reference numbers here. In addition, a second calculation algorithm 212 is executed, illustrated here as a broad arrow. The second calculation algorithm 212 determines a result value 214 directly depending on the floating point value 166 and the parameter value 182. The result interval 196 and the result value 214 are compared to one another via arrows 216 and 218, in order to validate the result interval 196. When this is done, the result interval 196 is output.

In a further exemplary embodiment not illustrated here, the result value 214 from the calculation unit 36 is compared with the result interval 198 of the calculation unit 38, in order to validate the result interval 198.

What is claimed is:

1. A method for operating a safety control device for safely controlling a hazardous installation having at least one actuator, the method comprising the steps of:
   providing a first calculation unit and providing a second calculation unit in the safety control device in order to form a redundant control unit,
   acquiring an input signal and feeding the input signal to the first and second calculation units,
   determining a floating point value depending on the input signal in each of the first and second calculation units,
   determining an input interval as a function of the floating point value in each of the first and second calculation units,
   determining a plurality of result intervals, wherein the first and second calculation units each determine a result interval as a function of the input interval by applying a first calculation algorithm to the input interval, the first calculation algorithm being based on interval arithmetic,
   comparing the result intervals from the first and second calculation units and determining an output value as a function of the result intervals, and
   outputting an output signal as a function of the output value, said output signal driving the at least one actuator.

2. The method of claim 1, wherein a calculation precision of at least one of the first and second calculation units is determined, and wherein the actuator is driven so as to bring the installation into a safe state, if the determined calculation precision is lower than a predefined threshold value.

3. The method of claim 1, wherein a calculation precision of at least one of the first and second calculation units is determined, and wherein an interval width of the input interval is determined as a function of the determined calculation precision.

4. The method of claim 1, wherein a result interval width of at least one of the result intervals is determined, and wherein the actuator is driven so as to bring the installation into a safe state, if the result interval width exceeds a predefined maximum width.

5. The method of claim 1, wherein the result intervals determined by the first and second calculation units are checked for an interval overlap from time to time, and wherein the actuator is driven so as to bring the installation into a safe state, if no interval overlap is detected.

6. The method of claim 5, wherein the result intervals determined by the first and second calculation units are regularly checked for the interval overlap.

7. The method of claim 1, wherein a result value is further determined as a function of the floating point value by using a second calculation algorithm which is substantially equivalent to the first calculation algorithm, and wherein the output value is further determined on the basis of the result value.

8. The method of claim 7, wherein the result value is compared with at least one of the result intervals from the first and second calculation unit, and wherein the actuator is driven so as to bring the installation into a safe state, if the result value lies outside of the at least one of the result intervals.

9. The method of claim 1, wherein the first and second calculation units are synchronized using the result intervals from the first and second calculation units.

10. The method of claim 1, wherein the input signal is acquired using a data bus.

11. The method of claim 1, wherein the output signal is output using a data bus.

12. The method of claim 1, wherein the at least one actuator controls a safety-relevant state parameter of the installation.

13. The method of claim 1, wherein the input signal is a sensor signal from a sensor that acquires the safety-relevant state parameter.

14. The method of claim 1, wherein a switching signal from an emergency-off button is received in each of the first and second calculation units, and wherein the at least one actuator is also driven as a function of said switching signal.

15. A safety control device comprising:
a first and a second calculation unit arranged so as to form a redundant control unit,
an input unit designed for receiving an input signal and for determining a floating point value depending on the input signal, and
an output unit designed for driving an actuator,
wherein the input unit is connected to each of the first and second calculation units for feeding the floating point value to the first and second calculation units,
wherein each of the first and second calculation units are configured to determine an input interval as a function of the floating point value and to determine a result interval as a function of the input interval by applying a first calculation algorithm to the input interval, the first calculation algorithm being based on interval arithmetic,
wherein the first and the second calculation units are connected for comparing the result intervals and for determining an output value as a function of the result intervals, and
wherein at least one of the first and second calculation units is connected to the output unit for outputting an output signal as a function of the output value, said output signal driving the at least one actuator.

* * * * *